(12) United States Patent
Rings

(10) Patent No.: US 9,207,098 B2
(45) Date of Patent: Dec. 8, 2015

(54) SHORT-TERM TRAVEL-TIME PREDICTION MODELING AUGMENTED WITH RADAR-BASED PRECIPITATION PREDICTIONS AND SCALING OF SAME

(71) Applicant: ITERIS, INC., Santa Ana, CA (US)

(72) Inventor: Joerg Rings, Berkeley, CA (US)

(73) Assignee: ITERIS, INC., Santa Ana, CA (US)

( * ) Notice: Subject to any disclaimer, the term of this patent is extended or adjusted under 35 U.S.C. 154(b) by 94 days.

(21) Appl. No.: 14/186,774

(22) Filed: Feb. 21, 2014

(65) Prior Publication Data
US 2015/0241242 A1 Aug. 27, 2015

(51) Int. Cl.
G01C 21/00 (2006.01)
G01C 21/36 (2006.01)
G01C 21/20 (2006.01)

(52) U.S. Cl.
CPC ............ G01C 21/3691 (2013.01); G01C 21/20 (2013.01)

(58) Field of Classification Search
None
See application file for complete search history.

(56) References Cited

U.S. PATENT DOCUMENTS

| 2014/0018106 A1* | 1/2014 | Fulger et al. ............... 455/456.3 |
| 2014/0278829 A1* | 9/2014 | MacAdam et al. .......... 705/7.42 |
| 2015/0095830 A1* | 4/2015 | Massoumi et al. ............ 715/771 |

* cited by examiner

Primary Examiner — Thomas Tarcza
Assistant Examiner — Adam Alharbi
(74) Attorney, Agent, or Firm — Lazaris IP

(57) ABSTRACT

A framework for estimating short-term travel times for one or more roadway links of a transportation network infrastructure models traffic speed predictions from collected traffic speed data and augments these predictions with precipitation predictions for the links being modeled. The framework employs strategies for scaling these augmented models for larger segments and areas of a roadway to minimize processing and training time. The travel time estimates generated by the framework are utilized to provide accurate routing information and recommendations to motorists, and to conduct more efficient traffic monitoring and infrastructure planning and maintenance activities.

27 Claims, 2 Drawing Sheets

SHORT-TERM TRAVEL-TIME PREDICTION MODELING AUGMENTED WITH RADAR-BASED PRECIPITATION PREDICTIONS AND SCALING OF SAME

FIELD OF THE INVENTION

The present invention relates to predicting travel times. Specifically, the present invention relates to a system and method of augmenting models for predicting travel time in the near and short term with predicted precipitation data and other weather information, and scaling these models for larger segments and areas of a roadway.

BACKGROUND OF THE INVENTION

Travel-time models based on speed predictions are a valuable tool for provide traffic information to motorists, and for traffic monitoring and planning by those responsible for transportation network infrastructure management. Many modeling approaches are currently in use that model predictions of travel times based on traffic speed. These existing approaches include regression methods, (such as linear regression and neural networks), nearest-neighbor methods, and other machine learning techniques (such as Random Forests, support vector machines, etc.). Other existing approaches use time-series modeling, like ARIMA or Kalman filtering. Other, more complex models utilize micro-simulation techniques that try to build a representation of the physical street and traffic system.

Regardless, the inclusion of weather information in these existing modeling approaches is uncommon. Where weather information is included, it is based on real-time or historical data only, and does not take into account the impact that a future state of precipitation may have on traffic speed. Therefore there is no known methodology for augmenting travel time predictions with precipitation over some future time interval.

BRIEF SUMMARY OF THE INVENTION

It is one objective of the present invention to provide a system and method of estimating short-term travel times using both traffic speed data and predictive weather data. It is another objective of the present invention to augment predictions of traffic speed on one or more links of a roadway network with predicted precipitation data for the links being modeled as well as a set of neighboring links. It is still another objective of the present invention to implement scaling strategies that enable parallelization of augmented models to larger segments and areas of a roadway to minimize processing and training time and realize faster and more efficient generation of output data. It is yet another objective of the present invention to improve travel time estimations on a roadway network to enable more accurate and faster distribution of information to motorists and more efficient traffic monitoring and planning by those responsible for maintaining a roadway network infrastructure.

The present invention is a system and method of estimating short-term travel times by augmenting predicted traffic speed data with predicted precipitation data, such as rainfall, for a segment of a roadway being modeled. The present invention models collected traffic speed data to produce predictions of traffic speeds, extracts precipitation information from weather data, and merges the two to generate an output that is then compared with a profile traffic speed. If the resultant augmented traffic speed prediction exceed a certain threshold, they are then used to generate estimates of travel times for the segment(s) of the roadway network. These estimates are further used to generate downstream data such as information for motorists, graphics for media outlets, and for uses such as infrastructure management, planning, and maintenance.

In one exemplary embodiment, the present invention discloses a method of estimating route travel times, comprising ingesting, as input data, weather data representing one or more of a real-time precipitation intensity and a predicted precipitation, ingesting, as input data, link data representing at least one segment of a roadway network, and ingesting, as input data, collected traffic speed data for vehicular flow on the at least one segment of a roadway network. Such a method also includes modeling the input data in a plurality of data processing modules configured within a computing environment in which the plurality of data processing modules are performed in conjunction with at least one processor, the modeling the input data further comprising determining a speed value from the collected traffic speed data for the at least one segment of a roadway network for each time period comprising a specified prediction horizon, by applying a regression analysis to a set of variables comprised of a current speed, an hourly factor, a day-of-the-week factor, a current precipitation indicator for the at least one segment of roadway network, a current precipitation indicator at any point on a grid comprising the at least one segment of roadway network, a predictive precipitation indicator for the at least one segment of roadway network, and a current speed for at least one neighboring link in the set of neighboring links, identifying a set of neighboring links proximate to the at least one segment of a roadway network for which the link data is ingested, extracting rainfall data for a center location of the at least one segment and for a grid of a specified distance around the center location in each direction, and merging the determined speed value with the rainfall data for the at least one segment and the set of neighboring links, computing a difference between the merged speed value and rainfall data and a route profile and generating a prediction of a traffic speed for the specified prediction horizon where the difference exceeds a speed threshold, and generating, as output data, one or more estimates of commuter travel times for a route comprising the at least one segment of the roadway network from the predicted traffic speed.

In another exemplary embodiment, the present invention discloses a system of augmenting short-term travel-time predictions with weather data, comprises a computer processor, and at least one computer-readable storage medium operably coupled to the computer processor and having program instructions stored therein, the computer processor being operable to execute the program instructions to model estimates of route travel times for at least one segment of a roadway network within a plurality of data processing modules, the plurality of data processing modules including a data ingest module configured to ingest input data that at least includes weather data representing one or more of a real-time precipitation intensity and a predicted precipitation, and link data representing at least one segment of a roadway network, and collected traffic speed data for vehicular flow on the segment of a roadway network, and a link training module. The link training module is configured to apply a statistical regression model to determine a speed value from the collected traffic speed data for the at least one segment of a roadway network for each time period comprising a specified prediction horizon from a set of a variables comprised of a current speed, an hourly factor, a day-of-the-week factor, a current precipitation indicator for the at least one segment of roadway network, a current precipitation indicator at any point on a grid comprising the at least one segment of roadway network, a predictive precipitation indicator for the at least one segment of roadway network, and a current speed for at least one neighboring link in the set of neighboring links, and calculate a predicted traffic speed for the specified prediction horizon by 1) extracting rainfall data from the weather data for a center location of the at least one segment and a grid of a specified distance around the center location in each direction, 2) merging the determined speed value with the rainfall data for the at least one segment and a set of neighboring links to produce an output speed value, 3) determining a difference between the output speed value and a traffic speed of a route profile, and 4) generating a traffic speed prediction for the specified prediction horizon where the difference exceeds a speed threshold. The system also includes an estimation module configured to convert the traffic speed prediction to an estimation of a route travel time, and a scaling module configured to parallelize the trained links to scale travel time predictions to a larger set of links.

In another exemplary embodiment, the present invention discloses a method of estimating route travel times, comprising training one or more links representing a segmented roadway network with input data representing traffic speed and weather information, the one or more links trained by applying a regression analysis to a set of a variables comprised of a current speed, an hourly factor, a day-of-the-week factor, a current precipitation indicator for the link being model, a current precipitation indicator at any point on a grid comprising the link being model, a predictive precipitation indicator for the link being modeled, and a current speed for at least one neighboring link to determine a speed value from the collected traffic speed data for each segment in the at least one segment of a roadway network for each specified time horizon, extracting rainfall data from the weather data for a center location of the at least one segment and a grid of a specified distance around the center location in each direction, and merging the determined speed value with the rainfall data for the at least one segment and a set of neighboring links to produce an output speed value. The method further includes predicting a traffic speed for each time horizon by computing a difference between the merged speed value and the rainfall data a speed threshold value, generating a travel time estimate when the predicted traffic speed exceeds a threshold time value, and parallelizing the one or more trained links so that the travel time estimate is scaled to a larger set of links representing the roadway network.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
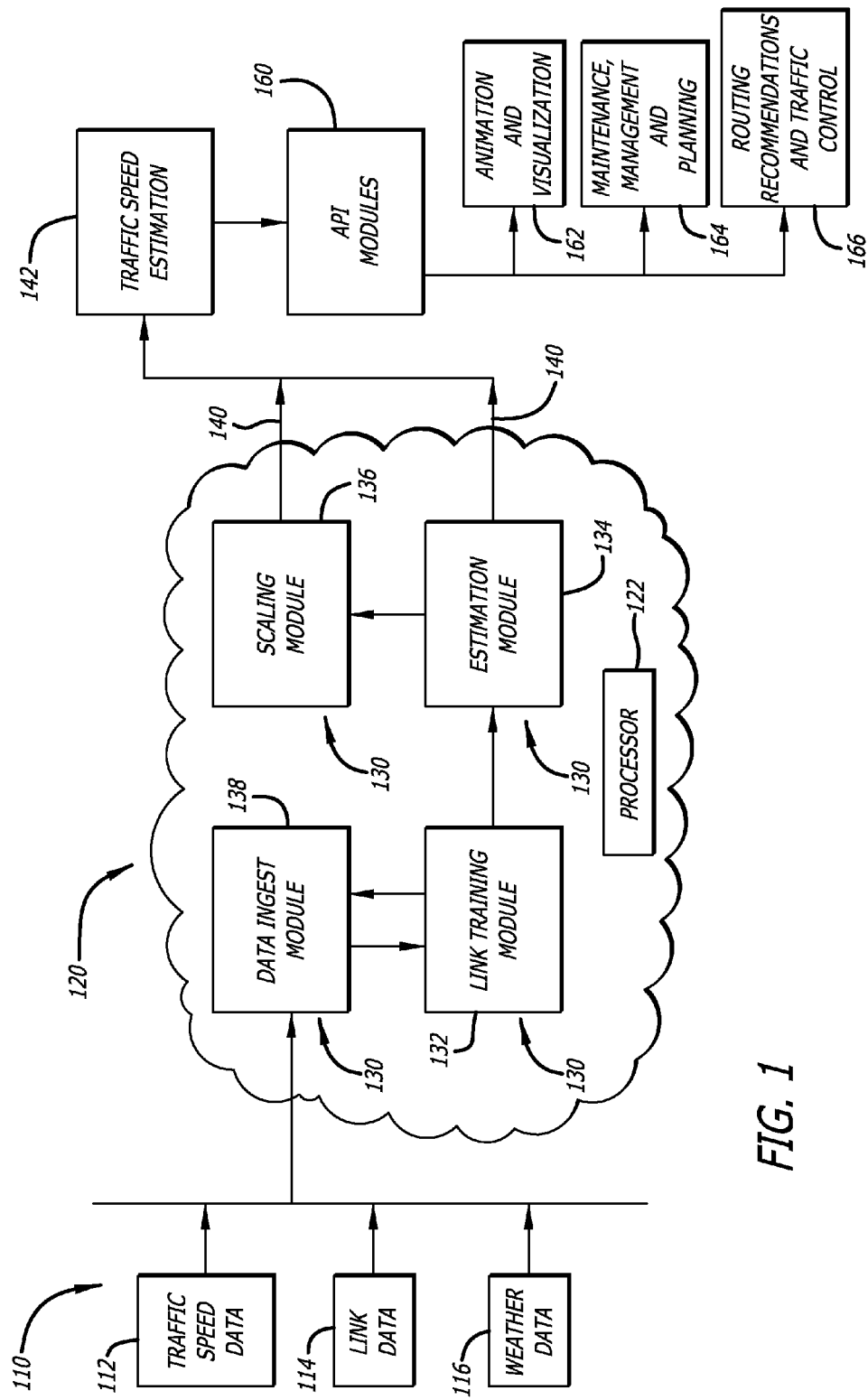
FIG. 1 is a block diagram of a travel time estimation framework according to the present invention.

The present invention is a system and method of estimating travel times for one or more links in a roadway network by augmenting predictions of traffic speeds with predicted precipitation data. FIG. 1 is a systemic block diagram showing a travel time estimation framework 100 of the present invention that models input data 110 comprised of collected traffic speed data 112, link data 114, and weather data 116. This input data is modeled in a computing environment 120 comprised of one or more computer processors 122 and a plurality of data processing modules 130 that together execute the steps and functions described herein to produce output data 140 at least in form of short-term travel time estimates 142. This output data 140 may be further applied in one or more application programming interfaces (APIs) within API modules 160 to produce content for the third party use, such as for example media distribution, on-board vehicle telematics, and for display and manipulation by mobile devices and applications installed thereon.

In one embodiment, the travel time estimates 142 are distributed to an animation and visualization module 161 among the API modules 160 for an application programming interface that that converts the output data 140 for use on a graphical user interface. Another API module 162 performs computations using the travel time estimates 142 that are vital to management, planning, and maintenance of a transportation network infrastructure, such as for example computing roadway network throughput, computing delay in vehicle-hours imposed by a traffic condition, computing a degree of roadway utilization as a measure of productivity, and modeling maintenance activities in work zones. Still another API module 162 may be configured to utilize output data 140 for generating real-time traffic control and route recommendations and other customized content for web distribution, accessibility using applications on mobile devices, tablets, or personal computers, and broadcast media distribution.

In the computing environment 120, at least one computer-readable storage medium 124 (not shown) is operably coupled to the one or more computer processors 122. The one or more computer processors 122 are configured to execute program instructions stored or accessed from the at least one computer-readable storage medium 124 to generate estimates of route travel times for at least one segment of a roadway network in the travel time estimation framework 100, as discussed further herein.

Figure 2:
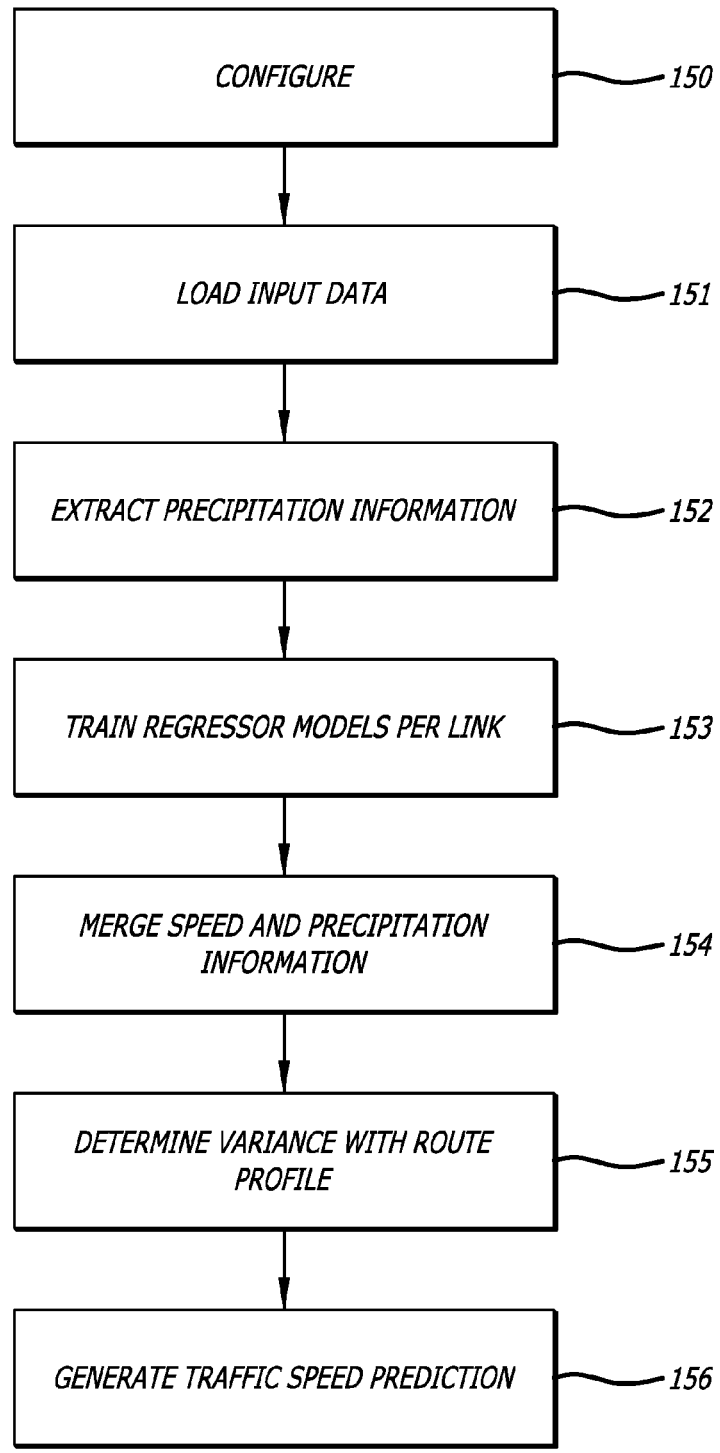
FIG. 2 is flow chart of steps involved in performing processing functions for modeling input data to estimate travel times according to the present invention.

The one or more data processing modules 130 at least include a link training module 132, which is configured to model the input data 110 by performing a number of processing functions as shown in the steps of the flow diagram of FIG. 2 to generate short-term travel time estimates 142 within the travel time estimation framework 100. Referring to FIG. 1 and FIG. 2, these functions include a configure function 150 which configures which links of a roadway network are to be trained. The configure function 150 may include settings such as geographical restriction tags, which for example restricts training only to a particular state or region. Another configuration setting includes specifying which link class to train, such as for example only major class 1 and class 2 highways. Still another configuration setting in this function 150 includes specifying how much input data 110 to pull, such as for example every 5 minutes from August 2013 through October 2013. This setting also influences the number of regression models to be trained as noted below.

The link training module 132 of the travel time estimation framework 100 then performs a load function 151 to ingest the input data 110 that is necessary for performing the modeling involved in estimating short-term travel times within the present invention. This function 151 loads link data 114 from one or more database collections for all links, the link data 114 including information such as latitude, longitude, class, name etc. This link data 114 is used to identify a specified number of neighboring links, such as for example four neighboring links for each link to be modeled. The link training module 132 also ingests collected traffic speed data 112 from one or more database collections or directly from third parties, and weather data 116 from at least one of a remote server or database collection, to a local repository for training regression models as discussed herein. This input data 110 may be ingested, in one embodiment, using a data ingest module 136 within the computing environment 120, as noted below.

The present invention then performs a function 152 to extract precipitation information from this set of weather data 116 for a center location of each link, and a grid of a specified distance or radius (for example, one mile) around it (in the W, NW, N, NE, E, SE, S, and SW positions) for every n time periods (for example, five minutes). A temporary file for each link is then created and stored.

The link training module 132 also applies a statistical regression model 153 to determine a speed value from the collected traffic speed data 112 for the at least one segment of a roadway network for each time period comprising a specified prediction horizon. This is determined from a set of a variables comprised of one or more of a current speed, an hourly factor, a day-of-the-week factor, a current precipitation indicator for the at least one segment of roadway network, a current precipitation indicator at any point on a grid comprising the at least one segment of roadway network, a predictive precipitation indicator for the at least one segment of roadway network, and a current speed for at least one neighboring link in the set of neighboring links.

A predicted traffic speed for the specified prediction horizon is then calculated by the link training module 132. This calculation is performed in a merging function 154 that merges the determined speed value with the extracted rainfall data for the at least one segment of the roadway network, and a set of neighboring links, to produce an output speed value, and a determination function 155 that determines a variance between the output speed value and a traffic speed of a route profile. Therefore the present invention compares the output speed value and the traffic speed of the route profile, and an output is generated where the difference from a route profile (reflecting long-term averaged speeds for weekdays or weekend with n-minute frequency) exceeds a certain threshold. Finally, the link training module generates a traffic speed prediction 156 for the specified prediction horizon where the difference exceeds a speed threshold.

In performing the above steps, the link training module 132 trains links in batches, for example 25 at a time, by loading collected traffic speed data 112 from the database for each newly discovered link and each new neighboring link, and storing the predicted traffic speed in one or more temporary files for training of later links. This is performed because the travel time estimation framework 100 may require the data again, for example where a link's data is needed later as another link's neighboring data.

The present invention prepares to train links by cleaning and preparing the collected traffic speed data 112 and the weather data 116 and merging the resultant predicted traffic speed with the extracted precipitation data in step 153. For both collected traffic speed data 112 and weather data 116, missing times are filled in, and default values are assigned to them. Default values include the free flow speed for collected traffic speed values 112, and "no rain" for the weather data 116. The link training module 132 trains regressor models in this step for prediction horizons at specified time intervals. For example, where time horizons of 5 minutes are specified for a period of 60 minutes, twelve (12) regression models are trained. The present invention then stores the full parameter file, otherwise updates a database containing parameters. The number of links in a batch, the size of the intervals, and the length of a prediction horizon to be modeled are all parameters which may be customized by users of the present invention.

The plurality of data processing modules 130 also include an estimation module 134, which is configured to convert the output traffic speed prediction to an estimate 142 of a route travel time. A scaling module 136 is configured to parallelize the trained links to scale travel time predictions to a larger set of links. The plurality of data processing modules 130 may further include a data ingest module 138, which is configured to ingest the input data 110 from a variety of different sources, as described further herein, and aggregate data for distribution for the link training module 132.

Weather data 116 may be ingested into the present invention in a number of different forms and from different sources. For example, weather data 116 may be provided as real-time and/or predicted precipitation intensity information calculated from reflectivity measured using weather radar systems. Such data may be sourced from the National Weather Service's WSR-88D radars across the country in real-time. This data contains a number of variables, one of which is called 'radar reflectivity', which is a measure of the amount of energy received back from a particular location relative to what was transmitted out. This is taken an indicator of precipitation intensity. It is stored as one of many discrete values and can be translated to rainfall in mm/hr as $10^{((5*R-24.77)/14.0)}$ with a reflectivity R.

Predictions of precipitation such as rainfall may also be provided from models that statistically project the movement of the current weather state into the future. These models may take weather data 116, such as data from numerical weather prediction models, surface networks, and both in-situ and remotely-sensed observation platforms, and use that information to generate future predictions of weather states. For example, output data from numerical weather models and/or surface networks may be combined with data from weather radars and satellites to reconstruct current weather conditions on any particular link or segment of roadway. It is to be noted that there are numerous industry NWP models available, and any such models may be used to provide weather data 116 in the present invention from which precipitation information is extracted for merging with collected traffic speed data. Such NWP models may include RUC (Rapid Update Cycle), WRF (Weather Research and Forecasting Model), GFS (Global Forecast System), and GEM (Global Environmental Model). Weather information may be received in real-time, and may come from several different NWP sources, such as from Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated "mesoscale" NWP models developed from data collected from real-time feeds to global observation resources may also be utilized. Such mesoscale numerical weather prediction models may be specialized in forecasting weather with more local detail than the models operated at government centers, and therefore contain smaller-scale data collections than other NWP models used. It is to be understood therefore that the present invention may be configured to ingest data from a plurality of sources, regardless of whether publicly, privately, or internally provided or developed.

Regardless of the source, and as suggested above, weather data 116 is capable of providing a precipitation indicator, such as whether it is raining or not. Additionally, a precipitation indicator may be a more complex variable (such as for example no, little or heavy rain). Other variables may also be included, such as temperature, for example as a confirmation (is it actually snowing?), and more specific data such as current precipitation type or state, such as whether the precipitation is sleet, hail, or freezing rain.

Weather data 116 is not only provided for the current location, but also for a grid of a specified radius or distance around it. This provides an indication of what is to happen in a future traffic state, as downstream rainfall may lead to a slowing of traffic speeds a future time, even at the current position. For example, rainfall from a westerly direction could reach the current location and produce slower traffic later. In the travel time estimation framework 100, application of regression techniques enables the present invention to learn which grid cells are influential for each model and prediction horizon and utilize that information for resultant traffic speed and travel time predictions.

Similarly, a predicted precipitation value for the prediction horizon is also extracted from the weather data 116. In the present invention, the choice of variables extracted from the rainfall data may be adjusted to keep the number of parameters low for processing simplicity, but it is contemplated that these variables may include more information, e.g. such as precipitation at the predicted grid at the prediction horizon, and precipitation at intermediate times (for example what is predicted to happen in 15 minutes if the prediction horizon is a time interval of 30 minutes). Other variables may be used to determine influential surrounding points around the current location, e.g. the downstream flow direction and the dominating direction storms take. In an alternate aspect of the present invention, precipitation information may be generally defined so as to include surrounding points of influence with regards to weather, instead of grid points around a particular location.

Collected traffic speed data 112 may include speed data and volume data reflective of real-time and/or actual conditions being experienced on a roadway. Crowd-sourced observational data may also be provided for either collected traffic data 112 or weather data 116 from individuals using mobile telephony devices or tablet computers that utilize software tools such as mobile applications, from social media feeds, or any other source or device permitting user entry of relevant information. Traffic speed data 112 may be realized from many different sources as noted further herein. Depending on the source, data may be provided in either a raw form or a processed form. Processed data may be subject to a variety of paradigms that take data generated by sensors or partners and extract relevant information for subsequent use in estimating short-term travel times in conjunction with precipitation data according to the present invention.

One example of a source of third-party traffic data is from external partners that collect probe data generated by global positioning system (GPS) devices. As noted above, this GPS probe data may be either in a raw form or in a processed form. Raw probe data is a collection of bulk data points in a GPS dataset, while probe data that has been processed has already been associated with information such as traffic speed on a roadway network. This GPS probe data may be pre-processed to develop speed estimates across traffic networks representing large geographic areas. Each such network is comprised of inter-connected links, but it is often the case that obtaining complete link speed estimates is hindered by the sparseness of the input data—i.e., GPS data is typically available for only part of the links representing a larger transportation network, and only for part of the time. In other words, collected GPS data is incomplete, making it hard for these existing systems to accurately estimate traffic speed across inter-connected network segments. Additionally, the quality and comprehensiveness of GPS probe data varies by vendor. One or more processing techniques may be therefore be used in the present invention, either prior to ingest to or within the travel time estimation framework 100, to iteratively smooth out this data so that any missing values are temporally and spatially filled in to ensure accuracy in the traffic information derived therefrom.

The present invention utilizes a regression model as noted herein to determine the speed on a link in specified intervals, such as 5, 10, 15, . . . , 60 minutes. For each such prediction horizon, the present invention fits a separate model. Variables used in this regression model are current speed, a factor for the hour of the day and (weekday, Friday or weekend), an indicator of whether it is raining currently, an indicator of whether it currently is raining on any grid point on a grid around the current point, an indicator of whether it is predicted that it will be raining at the predicted time, an indicator of whether precipitation falls as snow (or some other specific state as noted above), and the current speed at some neighboring links.

When identifying neighboring links, the present invention seeks to determine a specified number of the closest links on the same section of a roadway. In one aspect of the present invention, neighboring links are the four closest links on the same highway in the same flow direction. However, other methods of finding neighbors may also be utilized. Regardless, it is contemplated that the neighboring links include up- and downstream neighbors so as to include their influence on the current link in the future (traffic congestion traveling upstream, for example, or an upstream congestion reducing flow). For a prediction horizon of 60 minutes, this may be a large set of links or a random sample thereof.

In one embodiment of the present invention, a Ridge regression model is utilized. Because a coupling to neighboring links might lead to statistical instabilities, application of a Ridge regression model dampens out these statistical instabilities with regularization. Mathematically, small entries in the matrices that are solved are problematic because if the matrices are inverted, even small errors in these values can have huge effects. By adding the regularization in a Ridge regression model, the small values will be pushed a bit up, towards less problematic values that are not as influential.

A further utility of a Ridge regressor is that variables that are not influential, such as for example rainfall to the east, will be dampened out. This is helpful to building one model that fits all links, since the alternative would be to go through a feature selection process for each single link and then fit individual variable sets for each link. The choice of a Ridge regression model is also beneficial where runtime constraints are an issue, such as where processing speed from the time needed to train and scale. It should be noted, however, that other regression methods may also be utilized, such as Random Forest Regression or Gradient Boosting, as such techniques may also provide robustness against instabilities. The present invention is therefore not to be limited to any one specific type of regressor model.

In the scaling module 136, the present invention builds one set of models for a small subset of the road network, a stretch of road that is referred to as a "link" herein, to enable flexibility and scalability for the traffic state estimation framework 100. This approach generalizes to any such subdivision, but one example involves use of Traffic Message Channel (link) codes. A "set of models" refers to building one model for each prediction horizon specified, where "prediction horizon" refers to how far into the future a prediction is to be made. For example, one model may predict 5 minutes ahead, another 10 minutes ahead, and so on. In one embodiment, the present invention uses 12 models to cover intervals between 5 . . . 60 minutes, but as noted above, the horizon time prediction intervals may be adjusted by users.

Travel time prediction models on a state or even a national level must handle input data from at least tens, if not many hundreds of thousands of links. By treating links as independent, training time increases linearly with the number of links. Route travel times can then be estimated by traversing and adding link travel times on that route. Accordingly, the present invention employs scaling techniques to enable an easy parallelization, since each link can be trained independent of others. One such technique for performing training in parallel is to constrain geographical regions by latitude/longitude, and train each region on a different machine in parallel.

One method of parallelization may be the use of a classical multi-processing protocol across a cluster of machines, like the Message-Passing Interface (MPI, e.g. OpenMPI) or using an approach such as MapReduce (e.g. Amazon Elastic MapReduce). Other approaches may also be employed, such as manually running each region on a separate machine.

The present invention may also utilize techniques to reduce the amount of parameters that have to be loaded into memory. One such technique is the clustering of the parameter vectors. Instead of storing 12 vectors per link, clustering reduces it to 12 cluster numbers, where each cluster is an average parameter set that represents a class of parameter vectors well. Clustering may be accomplished using any suitable means or method, such as for example K-Means. Additionally, since the parameter vectors are quite long, clustering may be very high-dimensional, so that only arts of vectors may be clustered.

Regardless of the clustering method, instead of using one profile/parameter vector per link, the present invention may only employ a reference to a cluster, so that the cluster center would be used as the profile/parameter vector. Therefore, instead of saving for example 288 values per link per profile, the present invention only saves as 288*number of clusters values as profiles, and then one number per link that references which cluster it belongs to. This technique results in a reduction of memory usage and input/output processing time.

The present invention further contemplates that sampling strategies may be employed to further reduce the amount of input data needed, without depleting the information content. Such strategies are efficient as to what data to sample (e.g. more during rain, less during free-flow speed, leaving out incidents)—and when combined with implementing the sampling before sending the input data (e.g. by implementing the sampling on the database level), the amount of data ingested into the travel time estimation framework may be significantly reduced, resulting in gains in processing time.

The amount of output data generated may also be reduced. The present invention may use link "profiles" that are created from speed data with 5-minute frequencies averaged up over long periods of time, for example months, with one profile weekday and one per weekend. After making predictions, the present invention calculates the variance from the route profile and only reports what exceeds a certain threshold value that can be adjusted based on a trade-off between needed accuracy and speed/memory concerns. To reduce the amount of profiles needed, a clustering approach may also be employed, so that each link is assigned a profile from for example 200 different ones.

The systems and methods of the present invention may be implemented in many different computing environments 120. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A method of estimating route travel times, comprising:
   ingesting, as input data, weather data representing one or more of a real-time precipitation intensity and a predicted precipitation;
   ingesting, as input data, link data representing at least one segment of a roadway network;

ingesting, as input data, collected traffic speed data for vehicular flow on the at least one segment of a roadway network;

modeling the input data in a plurality of data processing modules configured within a computing environment in which the plurality of data processing modules are performed in conjunction with at least one processor, the modeling the input data further comprising:

determining a speed value from the collected traffic speed data for the at least one segment of a roadway network for each time period comprising a specified prediction horizon, by applying a regression analysis to a set of variables comprised of a current speed, an hourly factor, a day-of-the-week factor, a current precipitation indicator for the at least one segment of roadway network, a current precipitation indicator at any point on a grid comprising the at least one segment of roadway network, a predictive precipitation indicator for the at least one segment of roadway network, and a current speed for at least one neighboring link in the set of neighboring links;

identifying a set of neighboring links proximate to the at least one segment of a roadway network for which the link data is ingested;

extracting rainfall data for a center location of the at least one segment and for a grid of a specified distance around the center location in each direction, and merging the determined speed value with the rainfall data for the at least one segment and the set of neighboring links;

computing a difference between the merged speed value and rainfall data and a route profile and generating a prediction of a traffic speed for the specified prediction horizon where the difference exceeds a speed threshold; and generating, as output data, one or more estimates of commuter travel times for a route comprising the at least one segment of the roadway network from the predicted traffic speed.

2. The method of claim 1, further comprising defining a length of each time period comprising a specified prediction horizon.

3. The method of claim 2, further comprising training a set of models for each link represented in the link data, and constructing each model in the set of models for each time period comprising a specified prediction horizon.

4. The method of claim 1, further comprising extracting radar reflectivity data variables from the weather data and calculating precipitation intensity.

5. The method of claim 1, wherein the modeling the input data further comprises performing a parallelized training of each link using one or more geographical constraints.

6. The method of claim 1, wherein the modeling the input data further comprises sampling the input data by one or more of determining additional speed data during periods of precipitation intensity exceeding a specified threshold, ingesting less weather data during periods of free-flow speed, and filtering out link data in which a reduction in free-flow speed is determined from a result of an incident, the sampling the input data performed to increase processing speed by reducing an amount of data when merging the determined speed value with the rainfall data for the at least one segment and the set of neighboring links.

7. The method of claim 1, wherein the generating, as output data, one or more estimates of commuter travel times, further comprises calculating a difference of a travel time for a route from the route profile and generating a value representing an travel time estimate when the difference exceeds a specified threshold time value.

8. The method of claim 7, wherein the specified threshold time value is adjusted by determining a weighted importance between an accuracy of an estimate of a travel time and one or more of a processing time and a memory usage.

9. The method of claim 8, wherein a number of route profiles is determined by a clustering approach in which each link is assigned a profile from a set of profiles.

10. The method of claim 1, wherein the regression analysis is selected from a group comprised of a Ridge regression model, a Random Forest regression model, and a Gradient Boosting regression model to minimize statistical instabilities realized from applying speed and weather data from neighboring links.

11. The method of claim 1, further comprising configuring a training set of links with one or more of a geographical restriction, a classification of a roadway network, and a date range for an amount of input data.

12. The method of claim 1, wherein the collected speed data is modeled from data provided by one or more global positioning system sources.

13. A system of augmenting short-term travel-time predictions with weather data, comprising:

a computer processor; and at least one computer-readable storage medium operably coupled to the computer processor and having program instructions stored therein, the computer processor being operable to execute the program instructions to model estimates of route travel times for at least one segment of a roadway network within a plurality of data processing modules, the plurality of data processing modules including:

a data ingest module configured to ingest input data that at least includes weather data representing one or more of a real-time precipitation intensity and a predicted precipitation, and link data representing at least one segment of a roadway network, and collected traffic speed data for vehicular flow on the segment of a roadway network;

a link training module configured to:

apply a statistical regression model to determine a speed value from the collected traffic speed data for the at least one segment of a roadway network for each time period comprising a specified prediction horizon from a set of a variables comprised of a current speed, an hourly factor, a day-of-the-week factor, a current precipitation indicator for the at least one segment of roadway network, a current precipitation indicator at any point on a grid comprising the at least one segment of roadway network, a predictive precipitation indicator for the at least one segment of roadway network, and a current speed for at least one neighboring link in the set of neighboring links, and calculate a predicted traffic speed for the specified prediction horizon by 1) extracting rainfall data from the weather data for a center location of the at least one segment and a grid of a specified distance around the center location in each direction, 2) merging the determined speed value with the rainfall data for the at least one segment and a set of neighboring links to produce an output speed value, 3) determining a difference between the output speed value and a traffic speed of a route profile, and 4) generating a traffic speed prediction for the specified prediction horizon where the difference exceeds a speed threshold;

an estimation module configured to convert the traffic speed prediction to an estimation of a route travel time; and a scaling module configured to parallelize the trained links to scale travel time predictions to a larger set of links.

14. The system of claim 13, wherein the link training module is further configured to identify the set of neighboring links that are proximate to the at least one segment of a roadway network for which the link data is ingested.

15. The system of claim 13, wherein the data ingest module is configured to extract radar reflectivity data variables from the weather data and calculate precipitation intensity.

16. The system of claim 13, wherein the link training module is further configured to sample the input data by one or more of determining additional speed data during periods of precipitation intensity exceeding a specified threshold, modeling less weather data during periods of free-flow speed, and filtering out link data in which a reduction in free-flow speed is determined from a result of an incident, so that the input data is sampled to increase processing speed by reducing an amount of data when merging the determined speed value with the rainfall data for the at least one segment and the set of neighboring links.

17. The system of claim 13, wherein the estimation module calculates a time difference between a travel time for a route from the route profile and generates a value representing a travel time estimate when the time difference exceeds a specified threshold time value.

18. The system of claim 17, wherein the specified threshold time value is adjusted by determining a weighted importance between an accuracy of an estimate of a travel time and one or more of a processing time and a memory usage.

19. The system of claim 18, wherein a number of route profiles is determined by a clustering approach in which each link is assigned a profile from a set of profiles.

20. The system of claim 13, wherein the link training module configures a training set of links with one or more of a geographical restriction, a classification of a roadway network, and a date range for an amount of input data.

21. A method of estimating route travel times, comprising:
training one or more links representing a segmented roadway network with input data representing traffic speed and weather information, the one or more links trained by:
applying a regression analysis to a set of a variables comprised of a current speed, an hourly factor, a day-of-the-week factor, a current precipitation indicator for the link being model, a current precipitation indicator at any point on a grid comprising the link being model, a predictive precipitation indicator for the link being modeled, and a current speed for at least one neighboring link to determine a speed value from the collected traffic speed data for each segment in the at least one segment of a roadway network for each specified time horizon;
extracting rainfall data from the weather data for a center location of the at least one segment and a grid of a specified distance around the center location in each direction; and
merging the determined speed value with the rainfall data for the at least one segment and a set of neighboring links to produce an output speed value,
predicting a traffic speed for each time horizon by computing a difference between the merged speed value and the rainfall data a speed threshold value;
generating a travel time estimate when the predicted traffic speed exceeds a threshold time value; and
parallelizing the one or more trained links so that the travel time estimate is scaled to a larger set of links representing the roadway network.

22. The method of claim 20, further comprising identifying a set of neighboring links to the at least one segment of a roadway network.

23. The method of claim 20, further comprising configuring restrictions on the one or more links, the restrictions including one or more of a geographical restriction, a classification of a roadway network, and a date range for an amount of input data.

24. The method of claim 20, wherein the traffic speed is collected traffic speed data for vehicular flow on the at least one segment of a roadway network, and wherein the weather data represents one or more of a real-time precipitation intensity and a predicted precipitation.

25. The method of claim 20, wherein each specified time horizon includes one or more time periods having a defined length.

26. The method of claim 20, wherein the threshold time value is adjusted by determining a weighted importance between an accuracy of an estimate of a travel time and one or more of a processing time and a memory usage.

27. The method of claim 20, further comprising sampling the input data by one or more of determining additional speed data during periods of precipitation intensity exceeding a specified threshold, ingesting less weather data during periods of free-flow speed, and filtering out link data in which a reduction in free-flow speed is determined from a result of an incident, the sampling the input data performed to increase processing speed by reducing an amount of data when merging the determined speed value with the rainfall data for the at least one segment and the set of neighboring links.

* * * * *